United States Patent
Xu

(10) Patent No.: US 11,890,762 B2
(45) Date of Patent: Feb. 6, 2024

(54) METHOD AND APPARATUS FOR DETECTING GROUND ATTRIBUTE OF LEGGED ROBOT

(71) Applicant: Beijing Xiaomi Robot Technology Co., Ltd., Beijing (CN)

(72) Inventor: Haiwang Xu, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 152 days.

(21) Appl. No.: 17/514,976

(22) Filed: Oct. 29, 2021

(65) Prior Publication Data

US 2022/0168897 A1 Jun. 2, 2022

(30) Foreign Application Priority Data

Dec. 1, 2020 (CN) .......................... 202011389985.3

(51) Int. Cl.
*B25J 9/16* (2006.01)
*G06V 10/94* (2022.01)
(Continued)

(52) U.S. Cl.
CPC ........... *B25J 9/1694* (2013.01); *B25J 9/0003* (2013.01); *B25J 9/161* (2013.01); *B25J 13/003* (2013.01);
(Continued)

(58) Field of Classification Search
CPC ........ B25J 9/1694; B25J 9/0003; B25J 9/161; B25J 13/003; B25J 13/08; B25J 9/1674;
(Continued)

(56) References Cited

U.S. PATENT DOCUMENTS

2022/0355480 A1* 11/2022 Nagakari ................. B25J 5/007

FOREIGN PATENT DOCUMENTS

| CN | 110623601 A | 12/2019 |
| CN | 111643010 A | 9/2020 |
| WO | WO 2021060166 A1 | 4/2021 |

OTHER PUBLICATIONS

J. Christie and N. Kottege, "Acoustics based terrain classification for legged robots," 2016 IEEE International Conference on Robotics and Automation (ICRA), Stockholm, Sweden, 2016, pp. 3596-3603, doi: 10.1109/ICRA.2016.7487543. (Year: 2016).*

(Continued)

*Primary Examiner* — Adam R Mott
*Assistant Examiner* — Matthew C Gammon
(74) *Attorney, Agent, or Firm* — COZEN O'CONNOR

(57) ABSTRACT

A method for detecting a ground attribute of a legged robot includes obtaining a collision audio of a foot of the legged robot with a ground; and detecting a workable level attribute of the ground in a working environment of the legged robot according to the collision audio. The sound of the collision between the foot of the robot and the ground is collected, and the workable level attribute of the ground in the working environment of the legged robot is detected based on the sound, so that the operable level attribute can be effectively used to control the legs of the legged robot. On the one hand, the motion noise of the legged robot can be reduced, and on the other hand, the power consumption of the legged robot can be reduced, thereby increasing its range of motion.

16 Claims, 5 Drawing Sheets

(51) Int. Cl.
| | |
|---|---|
| *G06V 20/10* | (2022.01) |
| *G06V 40/20* | (2022.01) |
| *B25J 9/00* | (2006.01) |
| *B25J 13/00* | (2006.01) |
| *B25J 13/08* | (2006.01) |
| *B62D 57/02* | (2006.01) |
| *G06N 3/045* | (2023.01) |

(52) U.S. Cl.
CPC .............. *B25J 13/08* (2013.01); *B62D 57/02* (2013.01); *G06N 3/045* (2023.01); *G06V 10/95* (2022.01); *G06V 20/10* (2022.01); *G06V 40/25* (2022.01)

(58) Field of Classification Search
CPC ........ B25J 19/023; B25J 19/026; B25J 11/00; B25J 9/1602; B25J 9/1676; B25J 9/1679; B25J 9/1697; B25J 13/087; B62D 57/02; B62D 57/032; G06N 3/045; G06V 10/95; G06V 20/10; G06V 40/25; G01H 17/00
See application file for complete search history.

(56) References Cited

OTHER PUBLICATIONS

Valada, A., Spinello, L., Burgard, W. (2018). Deep Feature Learning for Acoustics-Based Terrain Classification. In: Bicchi, A., Burgard, W. (eds) Robotics Research. Springer Proceedings in Advanced Robotics, vol. 3. Springer, Cham. https://doi.org/10.1007/978-3-319-60916-4_2 (Year: 2018).*

Shen, Kelly and Michael F. Kelly. "Terrain Classification for Off-Road Driving CS-229 Final Report." (2017) (Year: 2017).*

M. M. Venâncio, R. S. Gonçalves and R. A. d. C. Bianchi, "Terrain Identification for Humanoid Robots Applying Convolutional Neural Networks," in IEEE/ASME Transactions on Mechatronics, vol. 26, No. 3, pp. 1433-1444, Jun. 2021, doi: 10.1109/TMECH.2020.3020781. (Year: 2021).*

European Patent Application No. 21207728.3 Extended Search and Opinion dated May 10, 2022, 10 pages.

Christie, J. et al. "Acoustics based Terrain Classification for Legged Robots" 2016 IEEE International Conference on Robotics and Automation (ICRA), May 2016, pp. 3596-3603.

Boddapati, V. et al. "Classifying environmental sounds using image recognition networks" Procedia Computer Science vol. 112, 2017, pp. 2048-2056.

Venâncio, M.M. et al. "Terrain Identification for Humanoid Robots Applying Convolutional Neural Networks" IEEE/ASME Transactions on Mechatronics, vol. 26, No. 3, Jun. 2021, pp. 1433-1444.

Guo, X et al. "Soft Foot Sensor Design and Terrain Classification for Dynamic Legged Locomotion" 2020 3rd IEEE International Conference on Soft Robotics (RoboSoft), 2020, pp. 550-557.

Chinese Patent Application No. 202011389985.3, Office Action dated Aug. 28, 2023, 8 pages.

Chinese Patent Application No. 202011389985.3, English translation of Office Action dated Aug. 28, 2023, 15 pages.

\* cited by examiner

METHOD AND APPARATUS FOR DETECTING GROUND ATTRIBUTE OF LEGGED ROBOT

CROSS-REFERENCE TO RELATED APPLICATION

The present application is based upon and claims priority to Chinese Patent Application No. 202011389985.3, filed on Dec. 1, 2020, the entire contents of which are incorporated herein by reference.

FIELD

The present disclosure relates to a field of robotics, and in particular to a method and apparatus for detecting a ground attribute of a legged robot.

BACKGROUND

With the continuous development of robot technology, legged robots have become more widely used, making the transition from research to home and consumer use. For example, robot pets such as robot dogs, have appeared to accompany users.

SUMMARY

The present disclosure provides a method and apparatus for detecting a ground attribute of a legged robot. The technical solutions of the present disclosure are described as follows.

Embodiments of the present disclosure include a method for detecting a ground attribute of a legged robot, including: obtaining a collision audio of a foot of the legged robot with a ground; and detecting a workable level attribute of the ground in a working environment of the legged robot according to the collision audio.

Embodiments of the present disclosure also include a method for controlling a legged robot, including: collecting the workable level attribute of the ground with the method as described above, and controlling the legged robot according to the workable level attribute.

Embodiments of the present disclosure also include an apparatus for detecting a ground attribute of a legged robot, including: one or more processors; a memory storing instructions executable by the one or more processors; in which the one or more processors are configured to: obtain a collision audio of a foot of the legged robot with a ground; and detect a workable level attribute of the ground in a working environment of the legged robot according to the collision audio.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

In order to enable those of ordinary skilled in the art to better understand the technical solutions of the present disclosure, the technical solutions in the embodiments of the present disclosure will be described clearly and completely with reference to the accompanying drawings.

It should be noted that the terms "first" and "second" in the specification and claims of the present disclosure and the above-mentioned drawings are used to distinguish similar objects, and not necessarily used to describe a specific sequence or sequence. It should be understood that the data used in this way can be interchanged under appropriate circumstances so that the embodiments of the present disclosure described herein can be implemented in an order other than those illustrated or described herein. The implementation manners described in the following exemplary embodiments do not represent all implementation manners consistent with the present disclosure. Rather, they are merely examples of devices and methods consistent with some aspects of the present disclosure as detailed in the appended claims.

In the related arts, robots, especially legged robots, have high requirements for robot mobility. On the one hand, legged robots are required to have strong mobility and a larger range of motion. A larger range of motion can reduce the power consumption of the legged robot so that it can support greater mobility. In addition, for the legged robot, its motion noise is also very large for the user. If the drive control for the foot or leg of the legged robot is not good, there may be very loud noises when the legged robot is running, thus affecting the normal user experience. However, the above-mentioned problems are based on the ground attributes of the legged robot. Therefore, effectively detecting the ground attribute of the working environment where the legged robot is located has become an urgent problem to be solved.

Figure 1:
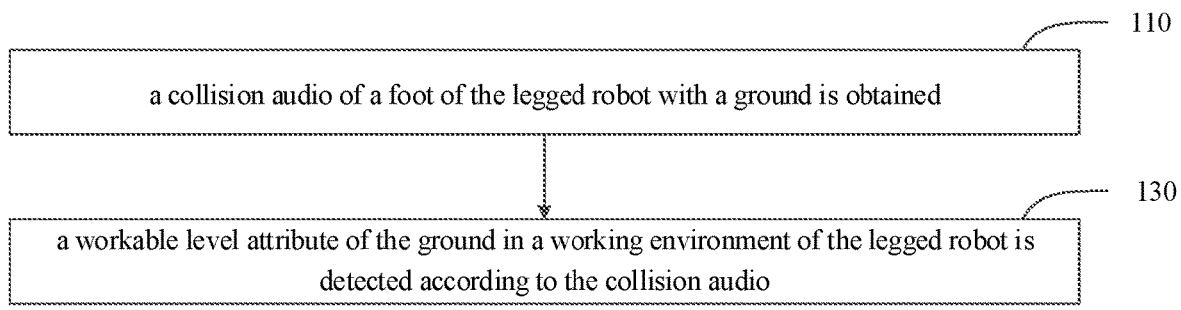
FIG. 1 is a flowchart showing a method for detecting a ground attribute of a legged robot according to an exemplary embodiment.

FIG. 1 is a flowchart showing a method for detecting a ground attribute of a legged robot according to an exemplary embodiment. The method for detecting the ground attribute is used in a legged robot. In the embodiments of the present disclosure, the legged robot may be a two-legged robot, a quadruped robot, or even a three-legged robot, or a multi-legged robot, and there is no limitation on this. FIG. 1 illustrates a flowchart of a method for detecting a ground attribute of a legged robot in an embodiment of the present disclosure, which includes the following steps.

At step 110, a collision audio of a foot of the legged robot with a ground is obtained.

In an embodiment of the present disclosure, a microphone may be installed in the foot of the legged robot, and the collision audio between the foot and the ground can be detected through the microphone. In another embodiment of the present disclosure, a cavity may be provided at the tail end of the foot of the legged robot, the microphone is arranged in the cavity, and an end cap is provided to close the cavity. Due to the sound conduction effect, the microphone placed in the cavity can also detect the impact audio. At the same time, the end cap of the cavity can also effectively protect the microphone.

In an embodiment of the present disclosure, a microphone may be provided on each foot of the legged robot for detection. Of course, in other embodiments of the present disclosure, a microphone may be provided on part of the feet, for example, only provided on a front foot of the legged robot, not on a rear foot, and only the front foot may be used for detection.

At step 130, a workable level attribute of the ground in a working environment of the legged robot is detected according to the collision audio.

In the embodiments of the present disclosure, one or more workable level attributes can be recognized by means of machine learning. The machine learning algorithm can be Convolutional Neural Network (CNN), Recurrent Neural Network (RNN), Long Short-Term Memory (LSTM), etc. In an embodiment of the present disclosure, the detected collision audio can be recognized through an image recognition model, thereby generating workable level attributes.

In an embodiment of the present disclosure, the collision audio is first sampled to generate a first collision image, and then the first collision image is input to a first neural network model to generate the workable level attribute.

In this embodiment, filtering processing (for example, high-pass filtering processing) may be performed on the collected collision audio to remove noise therein. After that, the collision audio after filtering the noise is sampled and subjected to a short-time Fourier transform, and added to a fixed-size image template. In this embodiment, since the short-time Fourier transform has time information, the frequency value after the time-series transformation can be filled into the image template to obtain the first collision image. Then the first collision image is input into the first neural network model to generate the workable level attribute. The first neural network model can be implemented through training, for example, the collision audio of the foot colliding with the ground of various materials may be collected and labeled. The training of the first neural network model can be completed through such training data.

In an embodiment of the present disclosure, the workable level attribute can be divided into multiple levels, and multiple workable level attributes may be generated by detecting the ground surface material in each work scene of the legged robot. Specifically, in an embodiment, the following four workable level attributes can be set:

- workable level attribute 1: high hardness and non-destructible materials, such as metal, stone, wood and polymer materials, etc.;
- workable level attribute 2: high hardness but destructible materials, such as glass, plastic and ceramics, etc.;
- workable level attribute 3: low hardness, non-destructible and deformable materials, such as cloth, cotton, thin rubber, sponge, etc.;
- workable level attribute 4: low hardness but destructible and deformable materials, such as cardboard, wet soil, mud and sand, etc.

For each material in the workable level attribute, the corresponding collision audio can be collected and input into the first neural network model for training. Similarly, for the aforementioned four workable level attributes, for legged robots, different workable level attributes have different mobility capabilities on the legged robot. For example, the lower the level, the stronger the mobility. As for the workable level attribute 4, generally speaking, it should be controlled by the legged robot to avoid it. Legged robots require a certain degree of hardness and rigidity on the acting ground, which can be used as a rigid body to support the robot body. Therefore, the legged robots preferably select grounds with workable levels attribute of 1-3 to walk.

Figure 2:
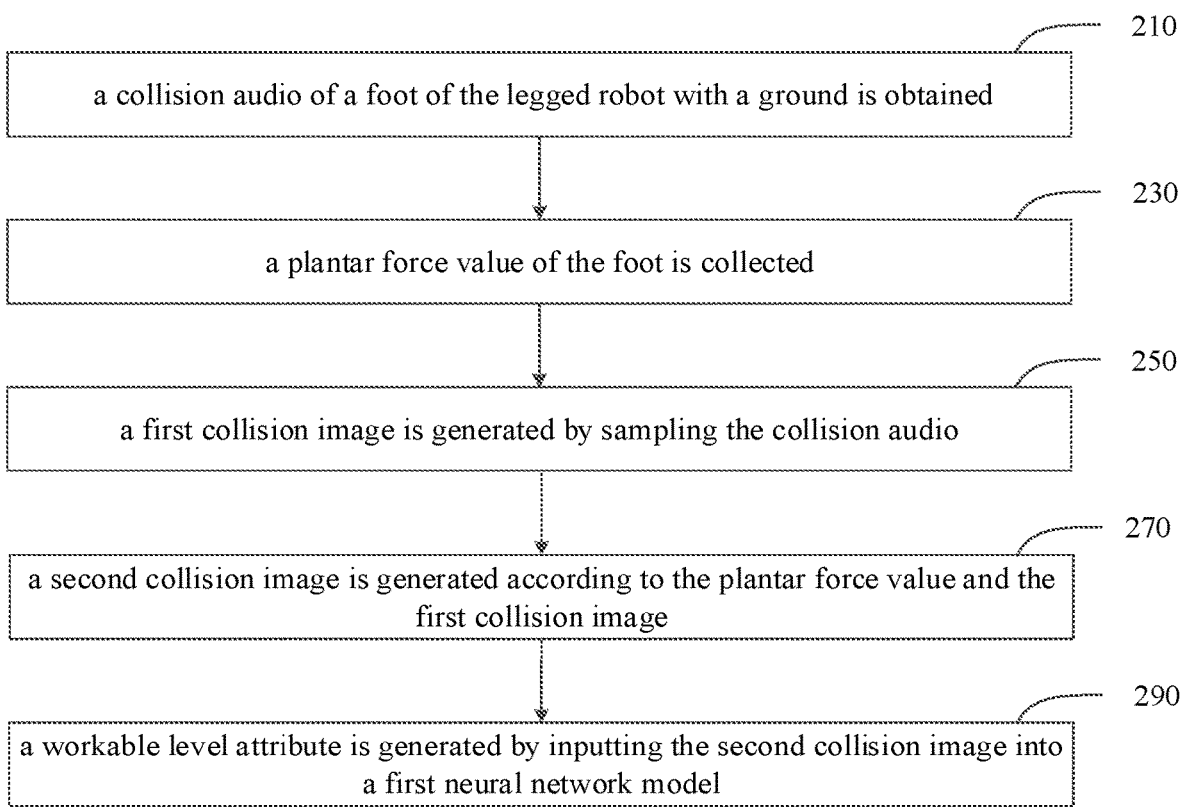
FIG. 2 is a flowchart showing a method for detecting a ground attribute of a legged robot according to another exemplary embodiment.

FIG. 2 is a flowchart showing a method for detecting a ground attribute of a legged robot according to another exemplary embodiment. The method includes the following steps.

At step 210, a collision audio of a foot of the legged robot with a ground is obtained.

In an embodiment of the present disclosure, a microphone may be installed in the foot of the legged robot, and the collision audio between the foot and the ground can be detected through the microphone. In another embodiment of the present disclosure, a cavity may be provided at the tail end of the foot of the legged robot, the microphone is arranged in the cavity, and an end cap is provided to close the cavity. Due to the sound conduction effect, the microphone placed in the cavity can also detect the impact audio. At the same time, the end cap of the cavity can also effectively protect the microphone.

In an embodiment of the present disclosure, a microphone may be provided on each foot of the legged robot for detection. Of course, in other embodiments of the present disclosure, a microphone may be provided on part of the feet, for example, only provided on a front foot of the legged robot, not on a rear foot, and only the front foot may be used for detection.

At step 230, a plantar force value of the foot is collected.

In an embodiment of the present disclosure, the plantar force value can be generated according to a driving current of a driving motor driving the foot. In some embodiments, the plantar force value can also be calculated by a driving voltage and other similar parameters. Specifically, the motor drives the feet through the legs of the legged robot. In one embodiment, the driving current of the driving motor driving the foot of the legged robot is first obtained, for example, it can be detected by a current transformer, or it can also be detected by other means. Then, the plantar force value of the foot is generated according to the driving current.

At step 250, a first collision image is generated by sampling the collision audio.

In this embodiment, the collision audio is sampled and short-time Fourier transform is performed, and the transform result is added to a fixed-size image template. The difference from the previous embodiment is that, the transformation result of the collision audio does not fill the above-mentioned image template in this embodiment, but some space is reserved for the plantar force value. For example, assuming that a size of the fixed-size image template is a 512×512 image, a 1×512 position is reserved for the plantar force value.

At step 270, a second collision image is generated according to the plantar force value and the first collision image.

In an embodiment of the present disclosure, an image sequence is generated according to the plantar force value, such as 1×512 data, and the image sequence is added to the first collision image to generate the second collision image. Of course, in other embodiments of the present disclosure, other methods may also be used to integrate the plantar force value into the first collision image.

At step 290, a workable level attribute is generated by inputting the second collision image into a first neural network model.

Similarly, in this embodiment, four workable level attributes may also be included. The first neural network model can be obtained by training in the same manner as described above, and will not be repeated here.

In an embodiment of the present disclosure, in order to improve the accuracy of collecting collision audio, it is necessary to set a start time and an end time of the collection. In this embodiment, in response to receiving a downward extension instruction of a leg associated with the foot, a microphone is activated to collect the collision audio, which is recorded as the start time of the collection. After a preset time, or in response to receiving a roll-up instruction, the microphone is controlled to finish the collection, which is recorded as the end time of the collection.

In an embodiment of the present disclosure, a ground image of the legged robot can also be collected through a camera. Through the image recognition of the material attributes of the ground, a basis for decision-making for subsequent robot control can be provided. Specifically, the ground image of the ground is first captured, and then the ground image is input to a second neural network to generate a material attribute of the ground, the second neural network determines the material attribute according to the texture of the ground image. In this embodiment, the second neural network can be implemented by training. For example, various ground images such as soil, sand, stone, slate, cardboard, soil, rubber, plastic plate, cloth, cotton, and metal plate can be input into the second neural network for training. In an embodiment of the present disclosure, a camera may be provided under the body of the legged robot, or the camera may be provided in the cavity of the foot, for example, the end cap of the cavity may be set to be transparent, so as to collect ground images.

In an embodiment of the present disclosure, it is possible to collect an image of the ground where the foot has already landed, or an image of the ground prior to the landing of the foot.

In the embodiments of the present disclosure, the actual application scene of the legged robot may include a ground situation that is relatively complicated. Therefore, the visual recognition result can provide assistance for the workable level attribute, for example, a material attribute may be input into the first neural network model, thereby improving the judgment accuracy and accuracy of the first neural network model.

Figure 3:
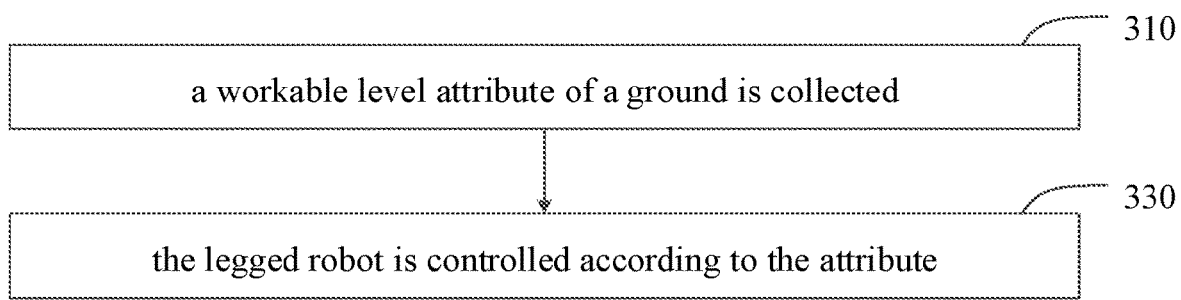
FIG. 3 is a flowchart of a method for controlling a legged robot according to an embodiment of the present disclosure.

As shown in FIG. 3, a flowchart of a method for controlling a legged robot according to an embodiment of the present disclosure is illustrated. The method includes following steps.

At step S310, a workable level attribute of a ground is collected.

In an embodiment of the present disclosure, the above-mentioned method may be used to collect one or more workable level attributes of the ground.

At step S330, the legged robot is controlled according to the attribute.

In the embodiments of the present disclosure, if an attribute of the ground has been known, a step frequency, a step height, a body height and torque output of each motor can be controlled according to the attribute to suit for the current environment, which is conducive to the stability and longevity of the legged robot. In addition, it can also reduce the noise of the foot colliding with the ground, and reduce the power consumption of the foot drive, thereby saving energy consumption for the legged robot.

In an embodiment of the present disclosure, a movement path of the legged robot can be planned according to the detected ground attributes. For example, it is possible to detect the workable level attribute of a road surface in front of the legged robot, to generate a movement path according to the workable level attribute of the road surface ahead, and control the legged robot to move according to the movement path. In the embodiments of the present disclosure, different grounds have a great influence on the actions of the legged robot. For example, the legged robot is most power-saving when walking on the ground with the workable level attribute 1. Therefore, the ground with workable level attribute 1 can be selected from the front road surface as a footing point of the legged robot, so as to form a movement path.

In another embodiment of the present disclosure, hazard avoidance can also be performed based on the detected attributes of the ground on which the legged robot has landed. For example, the workable level attribute of the road surface that the foot of the legged robot currently landed is detected, and it is determined whether the workable level attribute of the of the road surface that the foot of the legged robot currently landed is lower than a preset threshold, and the legged robot is controlled to return to a previous position in response to the workable level attribute being lower than the preset threshold. Specifically, for example, the workable level attribute 4 may cause the feet of the legged robot to fall into it. Therefore, the preset threshold can be set to 4. If the legged robot is detected to land on such ground, the foot will be controlled to return to the previous position, thereby avoiding danger and improving the safety performance of the legged robot.

Figure 4:
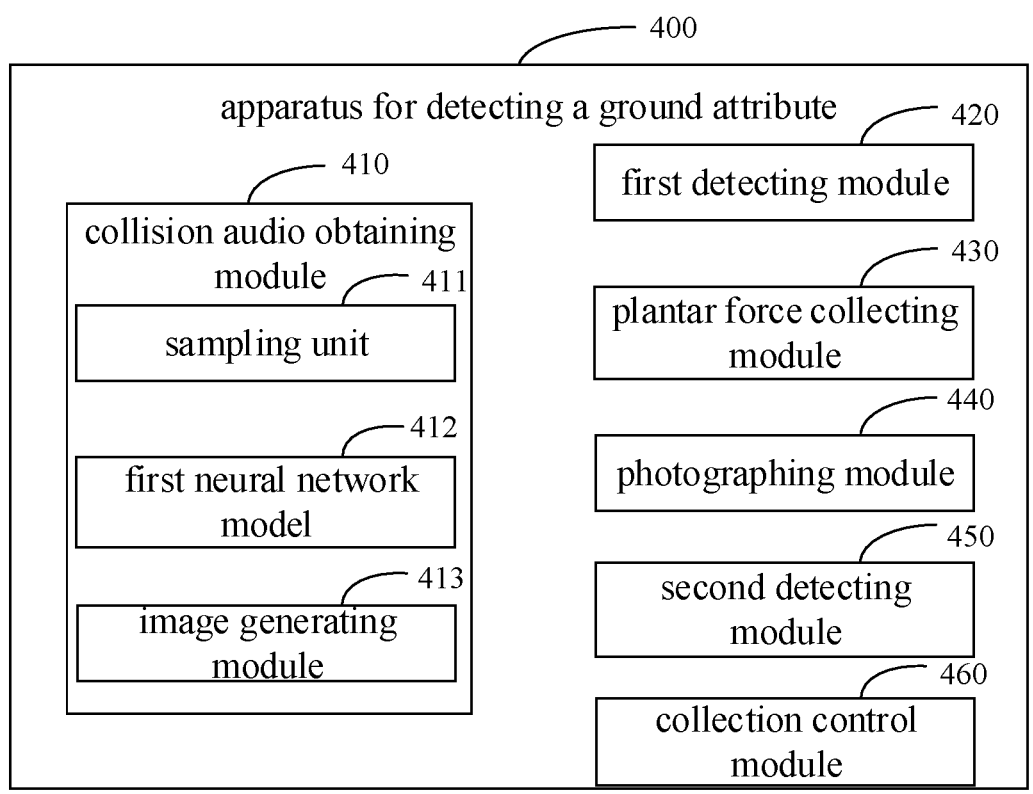
FIG. 4 is a structural diagram of an apparatus for detecting a ground attribute of a legged robot according to an embodiment of the present disclosure.

As shown in FIG. 4, an apparatus for detecting a ground attribute of a legged robot according to an embodiment of the present disclosure is illustrated. The apparatus 400 for detecting a ground attribute of a legged robot includes a collision audio obtaining module 410 and a first detecting module 420. In an embodiment of the present disclosure, the collision audio obtaining module 410 is configured to obtain a collision audio of a foot of the legged robot with a ground. In an embodiment of the present disclosure, a microphone may be installed in the foot of the legged robot, and the collision audio between the foot and the ground can be detected through the microphone. In another embodiment of the present disclosure, a cavity may be provided at the tail end of the foot of the legged robot, the microphone is arranged in the cavity, and an end cap is provided to close the cavity. Due to the sound conduction effect, the microphone placed in the cavity can also detect the impact audio. At the same time, the end cap of the cavity can also effectively protect the microphone. In an embodiment of the present disclosure, a microphone may be provided on each foot of the legged robot for detection. Of course, in other embodiments of the present disclosure, a microphone may be provided on part of the feet, for example, only provided on a front foot of the legged robot, not on a rear foot, and only the front foot may be used for detection.

In an embodiment of the present disclosure, the first detecting module 420 is configured to detect a workable level attribute of the ground in a working environment of the legged robot according to the collision audio. First, the collision audio is sampled to generate a first collision image, and then the first collision image is input to the first neural network model to generate the workable level attribute.

In this embodiment, filtering processing (for example, high-pass filtering processing) may be performed on the collected collision audio to remove noise therein. After that, the collision audio after filtering the noise is sampled and subjected to a short-time Fourier transform, and added to a fixed-size image template. In this embodiment, since the short-time Fourier transform has time information, the frequency value after the time-series transformation can be filled into the image template to obtain the first collision image. Then the first collision image is input into the first neural network model to generate the workable level attribute. The first neural network model can be implemented through training, for example, the collision audio of the foot colliding with the ground of various materials may be collected and labeled. The training of the first neural network model can be completed through such training data.

In an embodiment of the present disclosure, the workable level attribute can be divided into multiple levels, and multiple workable level attributes may be generated by detecting the ground surface material in each work scene of the legged robot. Specifically, in an embodiment, the following four workable level attributes can be set:

workable level attribute 1: high hardness and non-destructible materials, such as metal, stone, wood and polymer materials, etc.;

workable level attribute 2: high hardness but destructible materials, such as glass, plastic and ceramics, etc.;

workable level attribute 3: low hardness, non-destructible and deformable materials, such as cloth, cotton, thin rubber, sponge, etc.;

workable level attribute 4: low hardness but destructible and deformable materials, such as cardboard, wet soil, mud and sand, etc.

For each material in the workable level attribute, the corresponding collision audio can be collected and input into the first neural network model for training. Similarly, for the aforementioned four workable level attributes, for legged robots, different workable level attributes have different mobility capabilities on the legged robot. For example, the lower the level, the stronger the mobility. As for the workable level attribute 4, generally speaking, it should be controlled by the legged robot to avoid it. Legged robots require a certain degree of hardness and rigidity on the acting ground, which can be used as a rigid body to support the robot body. Therefore, the legged robots preferably select grounds with workable levels attribute of 1-3 to walk.

In an embodiment of the present disclosure, the first detecting module 410 includes a sampling unit 411 and a first neural network model 412. The sampling unit 411 is configured to generate a first collision image by sampling the collision audio. The first neural network model 412 is configured to generate the workable level attribute according to the first collision image.

In an embodiment of the present disclosure, the ground attribute detection device 400 further includes a plantar force collecting module 430, configured to collect a plantar force value of the foot.

In an embodiment of the present disclosure, the first detecting module 410 further includes an image generating module 413, configured to generate a second collision image according to the plantar force value and the first collision image, in which neural network model is configured to generate the workable level attribute according to the second collision image.

In an embodiment of the present disclosure, the plantar force collecting module 430 includes a drive current obtaining unit and a plantar force value generating unit. The driving current obtaining unit is configured to obtain a driving current of a driving motor driving the foot in the legged robot. The plantar force value generating unit is configured generate the plantar force value of the foot according to the driving current.

In an embodiment of the present disclosure, the image generating module 413 is configured to generate an image sequence according to the plantar force value; and generate the second collision image by adding the image sequence to the first collision image.

In an embodiment of the present disclosure, the apparatus 400 further includes a photographing module 440 and a second detecting module 450. The photographing module 440 is configured to photograph a ground image of the ground. The second detecting module 450 is configured to generate a material attribute of the ground by inputting the ground image to a second neural network, wherein the second neural network determines the material attribute according to a texture of the ground image.

In an embodiment of the present disclosure, the ground attribute detection device 400 further includes a collection control module 460, configured to activate a microphone to collect the collision audio in response to receiving a downward extension instruction of a leg associated with the foot; and control the microphone to finish collecting the collision audio after a preset time or in response to receiving a roll-up instruction of the leg.

Figure 5:
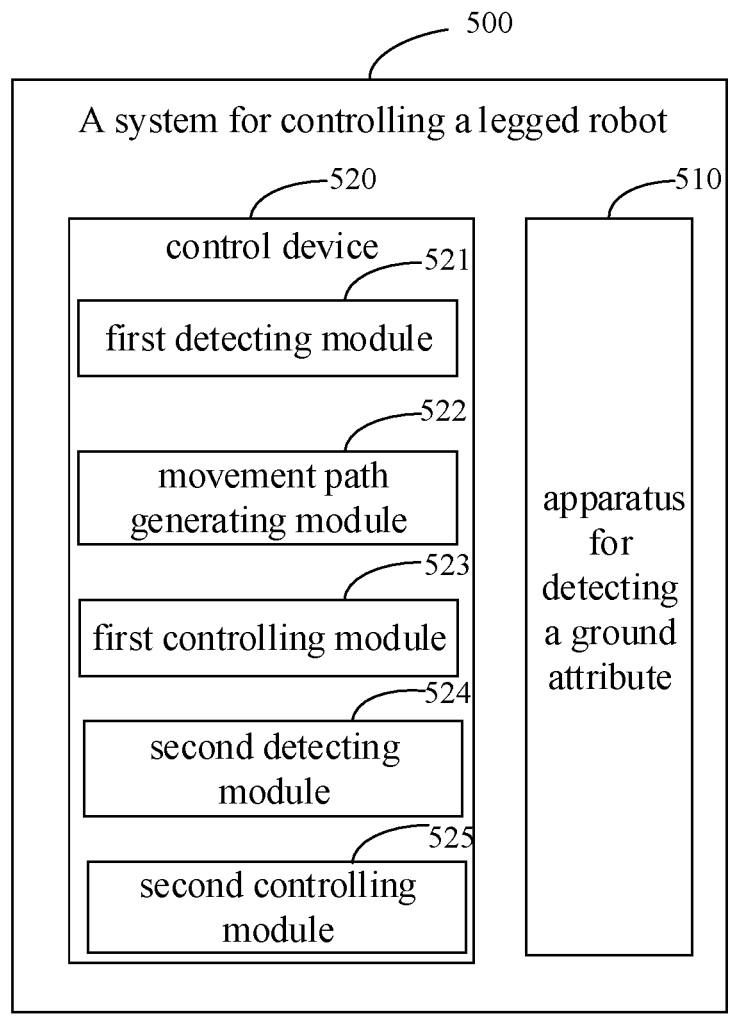
FIG. 5 is a structural diagram of a system for controlling a legged robot according to an embodiment of the present disclosure.

As shown in FIG. 5, a structural diagram of a system for controlling a legged robot according to an embodiment of the present disclosure is illustrated. The system 500 for controlling a legged robot includes an apparatus 510 for detecting a ground attribute of a legged robot and a control device 520. The apparatus 510 may be the above-mentioned apparatus 400. The control device 520 is configured to control the legged robot according to the ground attribute.

In an embodiment of the present disclosure, the control device 520 includes a first detecting module 521, a movement path generating module 522, and a first controlling module 523. The first detecting module 521 is configured to detect a workable level attribute of a road surface in front of the legged robot. The movement path generating module 522 is configured to generate a movement path according to the workable level attribute of the road surface. The first controlling module 523 is configured to control the legged robot is controlled to move according to the movement path.

In an embodiment of the present disclosure, the control device 520 includes a second detecting module 524 and a second controlling module 525. The second detecting module 524 is configured to detect a workable level attribute of a current road surface beneath the foot of the legged robot. The second controlling module 525 is configured to control the legged robot to return to a previous position in response to the workable level attribute of the current road surface being smaller than a preset threshold.

Figure 6:
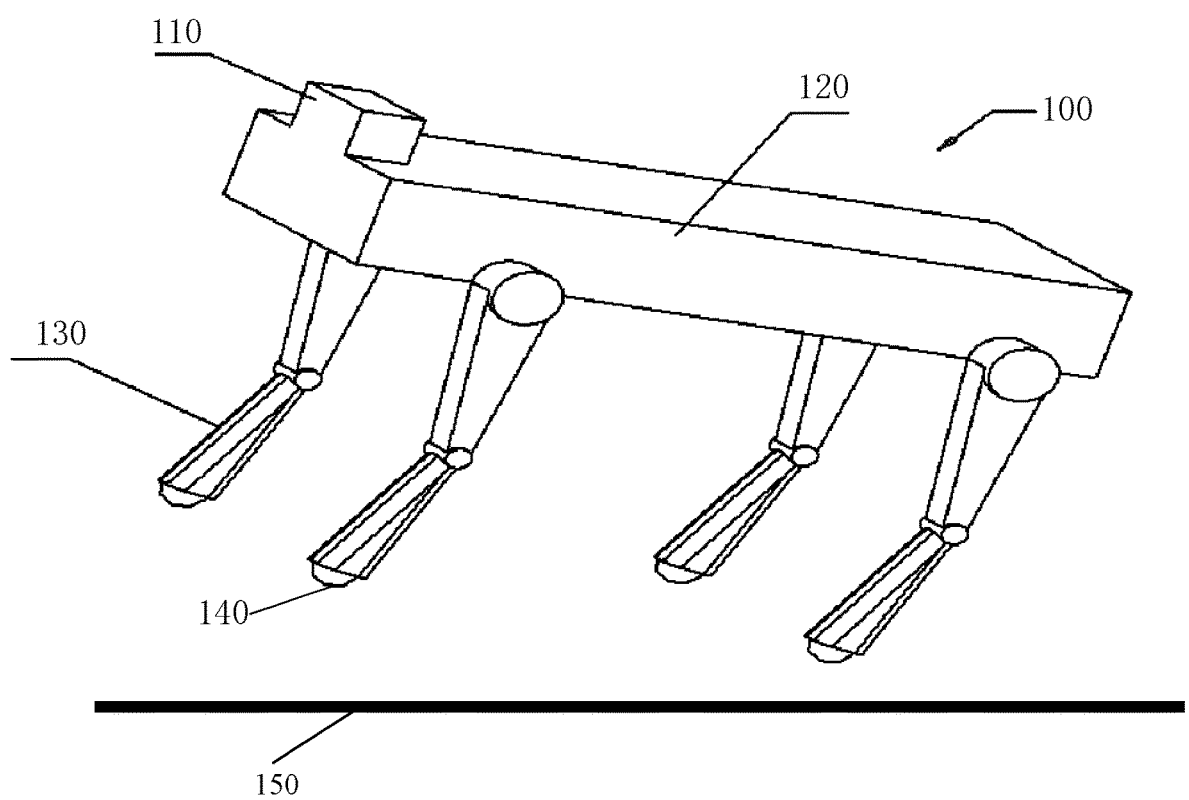
FIG. 6 is a schematic diagram of a legged robot according to an embodiment of the disclosure.

As shown in FIG. 6, a schematic diagram of a legged robot according to an embodiment of the disclosure is illustrated. The legged robot 100 includes a head 110, a torso body 120, a leg 130 connected to the torso body 120, and a foot 140 connected to the leg 130. In use, foot 140 of leg 130 makes contact with ground 150. Ground 150 may be made of various surface materials that affect the performance of legged robot 100. It also includes the apparatus for detecting a ground attribute of a legged robot as mentioned above, or the system for controlling a legged robot as mentioned above.

Figure 6A:
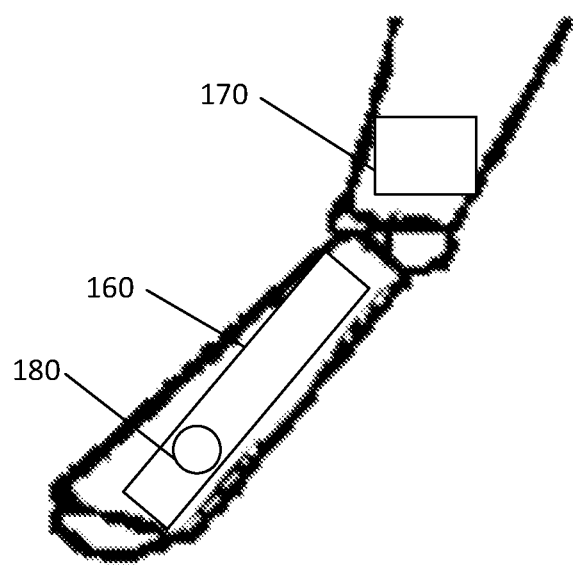
FIG. 6A is a detailed, internal schematic diagram of the leg and foot of the legged robot of FIG. 6.

FIG. 6A is a detailed, internal schematic diagram of the leg and foot of the legged robot of FIG. 6. Foot 140 of the legged robot comprises a cavity 160, a microphone 180 is arranged in the cavity, and the collision audio is collected through the microphone. Driving motor 170 may be located in leg 130 of legged robot 100, or in any convenient location in the robot that may be electrically connected to supply a driving current to foot 140.

In an embodiment of the present disclosure, an apparatus for detecting a ground attribute of a legged robot is also proposed, including a processor; a memory for storing instructions executable by the processor. The processor is configured to execute the instruction to implement the method for detecting a ground attribute of a legged robot as mentioned above, or the method for controlling a legged robot as mentioned above.

In an embodiment of the present disclosure, a storage medium is also proposed. When instructions in the storage medium are executed by a processor of an apparatus for detecting a ground attribute of a legged robot or a system for controlling a legged robot, the apparatus for detecting a ground attribute of a legged robot or the system for controlling a legged robot is caused to execute the method for detecting a ground attribute of a legged robot as described above or the method for controlling a legged robot as described above.

Regarding the device in the foregoing embodiment, the specific manner in which each module performs operation has been described in detail in the embodiment of the method, and detailed description will not be given here.

With the embodiments of the present disclosure, the sound of the collision between the foot of the robot and the ground is collected, and the workable level attribute of the ground in the working environment of the legged robot is detected based on the sound, so that the operable level attribute can be effectively used to control the legs of the legged robot. On the one hand, the motion noise of the legged robot can be reduced, and on the other hand, the power consumption of the legged robot can be reduced, thereby increasing its range of motion.

Those skilled in the art will easily think of other embodiments of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are defined by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A method for detecting a ground attribute of a legged robot, comprising:
    obtaining a collision audio caused by acting of a foot of the legged robot on a ground of the legged robot;
    generating a first collision image by sampling the collision audio;
    collecting a plantar force value of the foot;
    generating a second collision image according to the plantar force value and the first collision image; and
    generating a workable level attribute corresponding to the ground by inputting the second collision image into a first neural network model, wherein the workable level attribute is indicated by a value determined based on a degree of hardness and rigidity of the ground.

2. The method of claim 1, wherein collecting the plantar force value of the foot comprises:
    obtaining a driving current of a driving motor driving the foot in the legged robot; and
    generating the plantar force value of the foot according to the driving current.

3. The method of claim 1, wherein generating the second collision image according to the plantar force value and the first collision image comprises:
    generating an image sequence according to the plantar force value; and
    generating the second collision image by adding the image sequence to the first collision image.

4. The method of claim 1, further comprising:
    photographing a ground image of the ground; and
    generating a material attribute of the ground by inputting the ground image to a second neural network, wherein the second neural network determines the material attribute according to a texture of the ground image.

5. The method of claim 1, wherein the foot of the legged robot comprises a cavity, a microphone is arranged in the cavity, and the collision audio is collected through the microphone.

6. The method of claim 1, wherein obtaining the collision audio of the foot of the legged robot with the ground comprises:
    activating a microphone to collect the collision audio in response to receiving a downward extension instruction of a leg associated with the foot; and
    controlling the microphone to finish collecting the collision audio after a preset time or in response to receiving a roll-up instruction of the leg.

7. A method for controlling a legged robot, comprising:
    obtaining a collision audio caused by acting of a foot of the legged robot on a ground of the legged robot;
    generating a first collision image by sampling the collision audio;
    collecting a plantar force value of the foot;
    generating a second collision image according to the plantar force value and the first collision image;
    generating a workable level attribute corresponding to the ground by inputting the second collision image into a first neural network model, wherein the workable level attribute is indicated by a value determined based on a degree of hardness and rigidity of the ground; and
    controlling the legged robot according to the workable level attribute.

8. The method of claim 7, wherein controlling the legged robot according to the workable level attribute comprises:
    detecting a workable level attribute of a road surface in front of the legged robot;
    generating a movement path according to the workable level attribute of the road surface; and
    controlling the legged robot is controlled to move according to the movement path.

9. The method of claim 7, wherein controlling the legged robot according to the workable level attribute comprises:
    detecting a workable level attribute of a current road surface beneath the foot of the legged robot;
    determining whether the workable level attribute of the current road surface is smaller than a preset threshold; and controlling the legged robot to return to a previous position in response to the workable level attribute of the current road surface being not smaller than the preset threshold.

10. An apparatus for detecting a ground attribute of a legged robot, comprising:
one or more processors;
a memory storing instructions executable by the one or more processors;
wherein the one or more processors are configured to:
obtain a collision audio caused by acting of a foot of the legged robot on a ground of the legged robot;
generate a first collision image by sampling the collision audio;
collect a plantar force value of the foot generate a second collision image according to the plantar force value and the first collision image; and
generate a workable level attribute corresponding to the ground by inputting the second collision image into a first neural network model, wherein the workable level attribute is indicated by a value determined based on a degree of hardness and rigidity of the ground.

11. The apparatus of claim 10, wherein the one or more processors are configured to:
obtain a driving current of a driving motor driving the foot in the legged robot; and
generate the plantar force value of the foot according to the driving current.

12. The apparatus of claim 10, wherein the one or more processors are configured to: generate an image sequence according to the plantar force value; and generate the second collision image by adding the image sequence to the first collision image.

13. The apparatus of claim 10, wherein the one or more processors are configured to:
photograph a ground image of the ground; and
generate a material attribute of the ground by inputting the ground image to a second neural network, wherein the second neural network determines the material attribute according to a texture of the ground image.

14. The apparatus of claim 10, wherein the one or more processors are configured to:
activate a microphone to collect the collision audio in response to receiving a downward extension instruction of a leg associated with the foot; and control the microphone to finish collecting the collision audio after a preset time or in response to receiving a roll-up instruction of the leg.

15. The apparatus of claim 10, wherein the apparatus is comprised in a system for controlling the legged robot, and the system comprises a control device configured to control the legged robot according to the ground attribute.

16. The apparatus of claim 15, wherein the control device is configured to detect a workable level attribute of a road surface in front of the legged robot; generate a movement path according to the workable level attribute of the road surface; and control the legged robot is controlled to move according to the movement path.

* * * * *